(12) United States Patent
Jung

(10) Patent No.: US 9,446,844 B2
(45) Date of Patent: Sep. 20, 2016

(54) AIRCRAFT SYSTEM THAT ENABLES GROUND TRAVELING

(76) Inventor: Soo Cheol Jung, Daejeon (KR)

( * ) Notice: Subject to any disclaimer, the term of this patent is extended or adjusted under 35 U.S.C. 154(b) by 166 days.

(21) Appl. No.: 13/125,307

(22) PCT Filed: Oct. 19, 2009

(86) PCT No.: PCT/KR2009/006030
§ 371 (c)(1),
(2), (4) Date: Apr. 20, 2011

(87) PCT Pub. No.: WO2010/047507
PCT Pub. Date: Apr. 29, 2010

(65) Prior Publication Data
US 2011/0192931 A1 Aug. 11, 2011

(30) Foreign Application Priority Data
Oct. 20, 2008 (KR) ........................ 10-2008-0102770

(51) Int. Cl.
*B64C 37/00* (2006.01)
*B64C 29/00* (2006.01)
*B60F 5/02* (2006.01)

(52) U.S. Cl.
CPC ............. *B64C 29/0033* (2013.01); *B60F 5/02* (2013.01); *B64C 37/00* (2013.01)

(58) Field of Classification Search
CPC ............................... B64C 37/00; B64C 29/33
USPC .............................................. 244/2, 46, 49
See application file for complete search history.

(56) References Cited

U.S. PATENT DOCUMENTS

| | | | |
|---|---|---|---|
| 1,783,458 A | | 12/1930 | Windsor |
| 2,363,129 A | * | 11/1944 | Heitmann ...................... 244/7 R |
| 2,392,506 A | * | 1/1946 | Rossmann ...................... 244/49 |
| 3,371,886 A | | 3/1968 | Schertz |
| 3,463,420 A | * | 8/1969 | Carter et al. .................... 244/46 |
| 3,807,661 A | * | 4/1974 | Ikeda ................................ 244/5 |

(Continued)

FOREIGN PATENT DOCUMENTS

| | | |
|---|---|---|
| CN | 2354799 Y | 12/1999 |
| GB | 214305 A | 4/1924 |

(Continued)

OTHER PUBLICATIONS

International Search Report for PCT/KR2009/006030 Mailed on Jun. 15, 2010.
Written Opinion of the International Search Authority for PCT/KR2009/006030.

*Primary Examiner* — Justin Benedik
(74) *Attorney, Agent, or Firm* — Revolution IP, PLLC

(57) ABSTRACT

Disclosed is a flying object system performing ground traveling, which travels on the ground and flies in the air. The flying object system travels with three or more wheels connected to a main body, generates flying force through wings symmetrically installed at both sides of the main body, and is provided with plural propellers, operated by a control lever and installed on the wings and at least a part of the main body, each of the wings being divided into a plurality of compartments to be folded or be changed in shape by pressure of gas or air. Therefore, the flying object system travels on a road on the ground and takes off and flies in the air in traffic congestion, and flies in the air and lands and travels on a road on the ground if necessary, thus rapidly moving to a destination without the effects of traffic congestion.

14 Claims, 6 Drawing Sheets

(56) References Cited

U.S. PATENT DOCUMENTS

| | | | |
|---|---|---|---|
| 5,307,725 A * | 5/1994 | Desmond et al. | 89/36.14 |
| 5,890,441 A * | 4/1999 | Swinson et al. | 244/12.3 |
| 6,824,098 B1 | 11/2004 | Belloso | |
| 7,249,732 B2 * | 7/2007 | Sanders et al. | 244/23 A |
| 2002/0153452 A1 | 10/2002 | King et al. | |
| 2003/0066932 A1 * | 4/2003 | Carroll | 244/120 |
| 2004/0066082 A1 | 4/2004 | Mears et al. | |
| 2006/0060706 A1 | 3/2006 | Elam | |
| 2006/0202081 A1 | 9/2006 | Milde, Jr. | |
| 2006/0226281 A1 * | 10/2006 | Walton | 244/17.23 |
| 2006/0278757 A1 | 12/2006 | Kelleher | |
| 2011/0192931 A1 * | 8/2011 | Jung | 244/2 |

FOREIGN PATENT DOCUMENTS

| | | | |
|---|---|---|---|
| GB | 789098 A | 1/1958 | |
| JP | 2006-051841 | 2/2006 | |
| JP | 2006176073 A | 7/2006 | |
| JP | 2006517282 A | 7/2006 | |
| JP | 2008011193 A | 1/2008 | |
| KR | 10-1996-0040996 A | 12/1996 | |
| KR | 10-0150340 | 6/1998 | |
| KR | 0150340 | * 12/1998 | B60F 5/02 |
| WO | 2005/037644 A1 | 4/2005 | |
| WO | 2008-019697 | 2/2008 | |

* cited by examiner

AIRCRAFT SYSTEM THAT ENABLES GROUND TRAVELING

BACKGROUND OF THE INVENTION

1. Field of the Invention

The present invention relates to a flying object system performing ground traveling, which takes off and lands during stoppage or movement, performs both traveling on the ground and flying in the air, has a light weight to minimize fuel consumption, is high in safety, and reaches a destination in the shortest time.

2. Description of the Related Art

Recently, a demand for vehicles, i.e. ground transportation, has been increased according to industrial development and income increase. On the contrary, since roads, on which vehicles can travel, are limited, serious traffic problems, such as traffic congestion, are on the rise.

In order to solve the above traffic problems, various measures have been proposed. The expansion of roads is restricted within some degree from the structural point of view, and thus a rotation system of vehicles has been proposed. However, since a demand for vehicles has been rapidly increased due to the pursuit of an economically stabilized life, such an artificial measure is not a fundamental solution.

Therefore, other measures to solve the above-described problems of ground transportation must be found from various angles. One of these measures is use of underground or air transportation.

However, the underground transportation (for example, a subway) requires an underground space for movement, and thus has various limits from the geological point of view as well as requires enormous construction expenses.

Further, the air transportation (for example, an airplane) requires a wide space for takeoff and landing and causes a difficulty in traveling on the ground due to short-distance movement, and thus is not a fundamental solution of the traffic problems.

Accordingly, in view of the problems of the above-described transportations, a transportation, which travels on a road on the ground and takes off and flies in the air in the event of traffic congestion, or flies in the air and lands and travels on a road on the ground if necessary, and thus rapidly moves to a destination without the effects of traffic congestion, has been required.

As one measure to prevent the above traffic congestion, the applicant of the present invention proposed an aircar, which performs both traveling on the ground and flying in the air, in Korean Patent Registration No. 150340. As shown in FIG. 1, the aircar includes both wing units 10, each of which has a propeller unit 12, which horizontally and vertically changes direction thereof to allow the aircar to ascend, descend, and move forward and backward, a body 20, on which the wing units 10 are horizontally and vertically foldably installed, provided with left and right driving wheels on the lower part thereof, and a tube unit 5, the inside of which is divided into a plurality of compartments 5b by a plurality of partitions 5a such that the tube unit 5 is expanded and contracted by supplying gas into the compartments 5b or discharging the gas from the compartments 5b, provided at the outside of the wing units 10 and the body 20 and made of silicon.

Further, a propeller 13 of the propeller unit 12, which is driven by a hydraulic motor M3, is journalled at each of the wing units 10 using a rotary shaft, and the angle of rotary blades 13a of the propeller 13 is adjusted to accelerate and decelerate the speed of the aircar during takeoff and landing, traveling, and flying. The aircar further includes a vertical stabilizer 6 provided with a rudder 6', and a horizontal stabilizer 7 provided with an elevator 7'.

However, in the aircar, which has the propellers 13 at both sides of the main body 20, when the main body 20 is not correctly balanced at the front and rear portions thereof in the event of landing, it is difficult to achieve stable takeoff and landing of the aircar, and when the propeller 13 provided with any one of the wing units 10 is out of order, it is difficult to achieve stable flight.

SUMMARY OF THE INVENTION

Therefore, the present invention has been made in view of the above problems, and it is an object of the present invention to provide a flying object system performing ground traveling, which travels on a road on the ground and takes off and flies in the air in traffic congestion, and flies in the air and lands and travels on a road on the ground if necessary to rapidly move to a destination without the effects of traffic congestion, has a tube shape as a whole to alleviate impact in the event of a crash and thus be used stably, and properly varies the shape of wings and lift force generated from respective propellers according to usage conditions to improve flying performance.

In accordance with the present invention, the above and other objects can be accomplished by the provision of a flying object system performing ground traveling, which travels with three or more wheels connected to a lower surface of a main body, generates flying force through wings symmetrically installed at both sides of the main body, and is provided with a plurality of propellers, operated by a control lever and installed on the wings and at least a part of the main body, to generate lift force and propulsive force of the main body, each of the wings being divided into a plurality of compartments to be folded or be changed in shape by pressure of air or gas.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
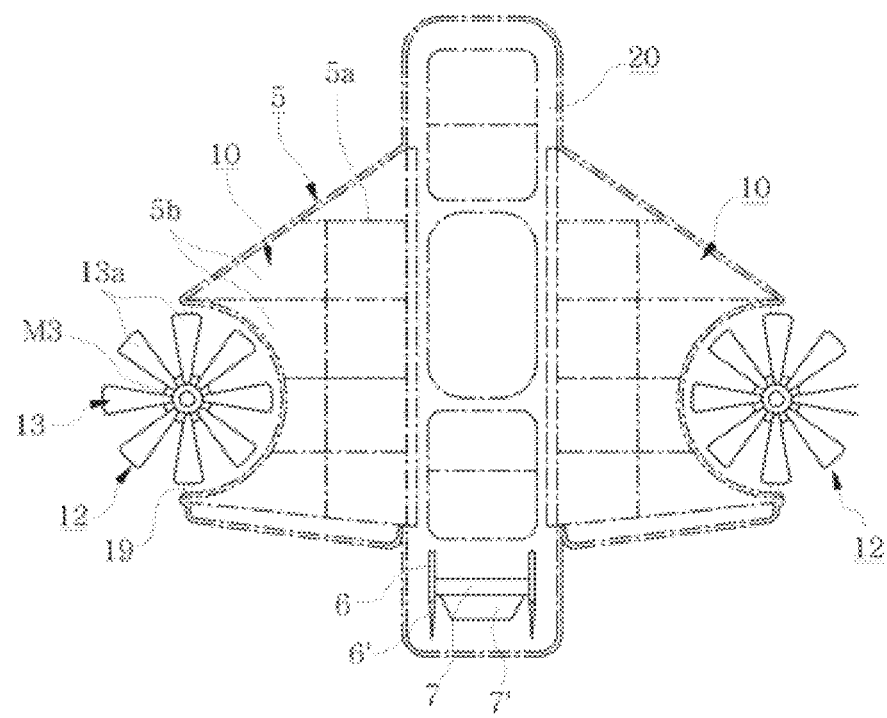
FIG. 1 is a plan view illustrating a conventional flying object.
Figure 2:
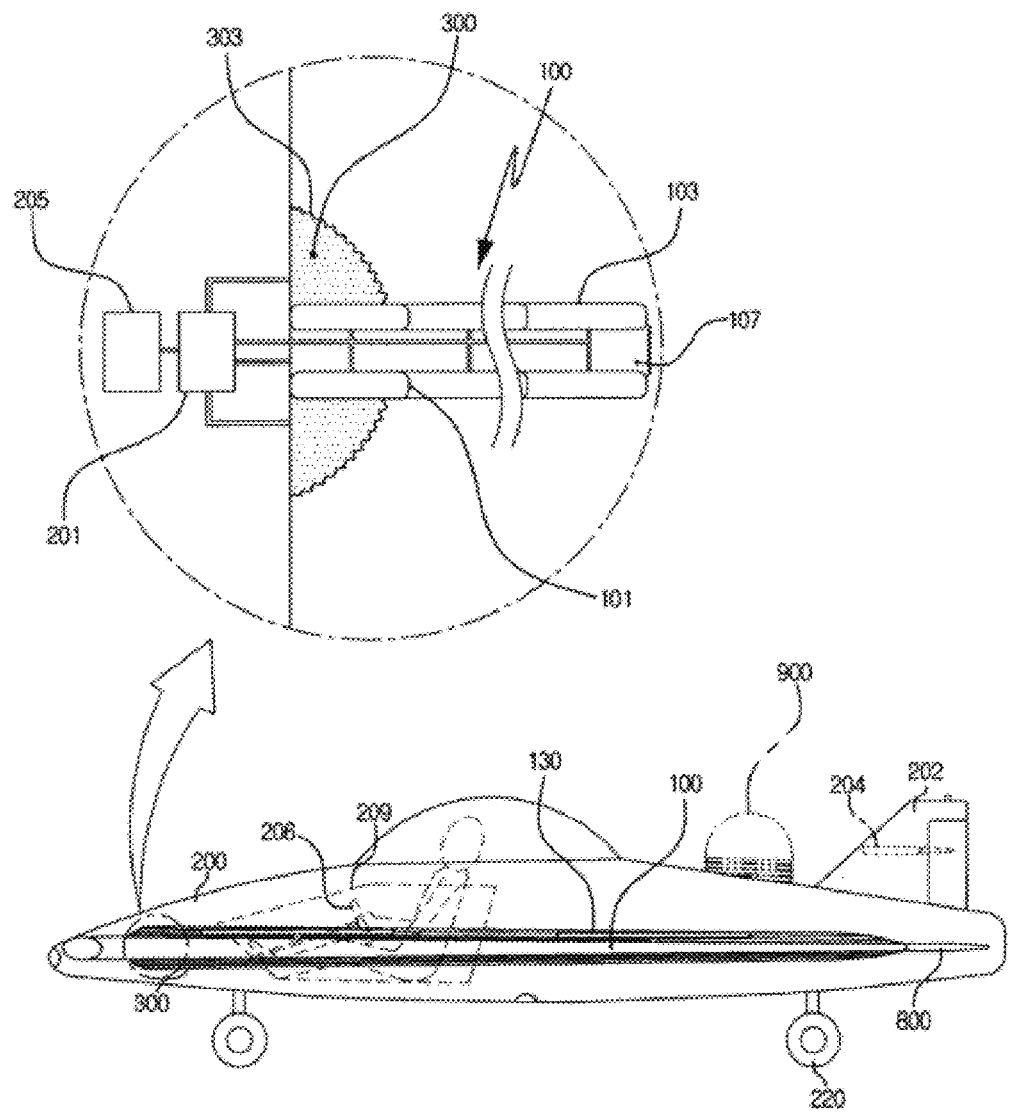
FIGS. 2, 3 and 4 are side, rear, and plan views illustrating a flying object system in accordance with one embodiment of the present invention.
Figure 3:
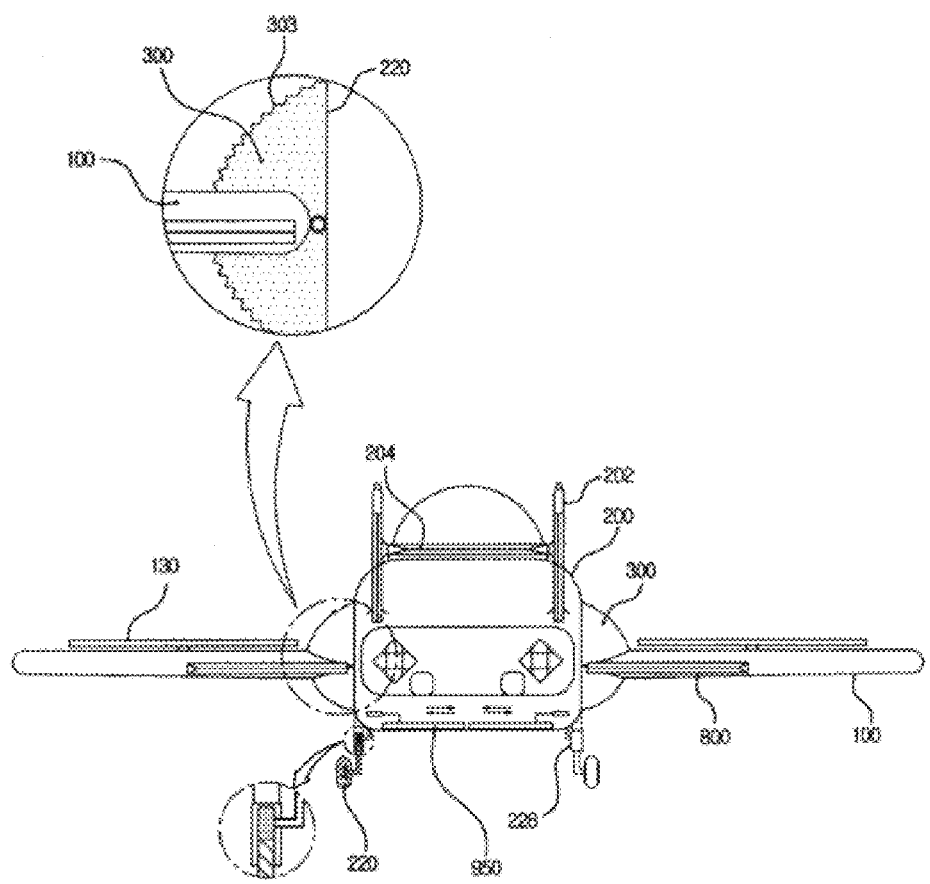
Figure 4:
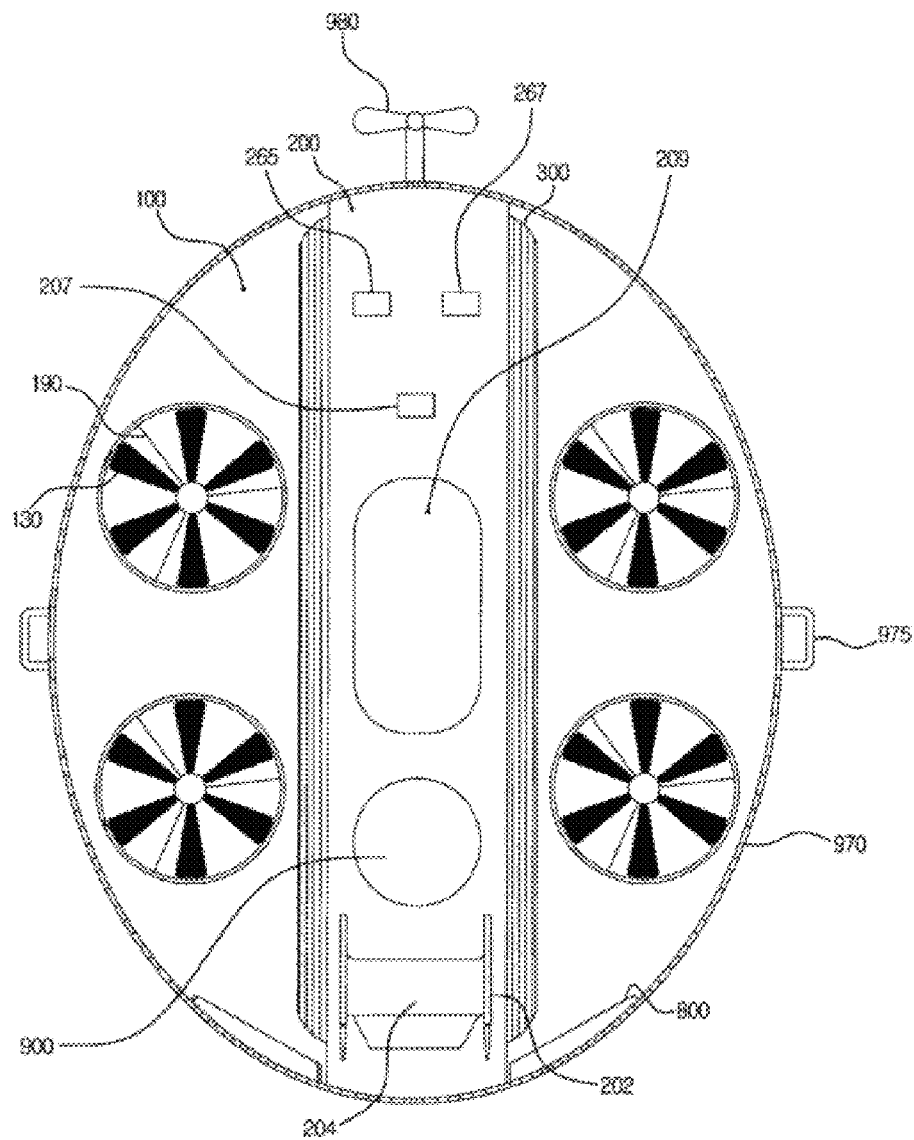
Figure 5:
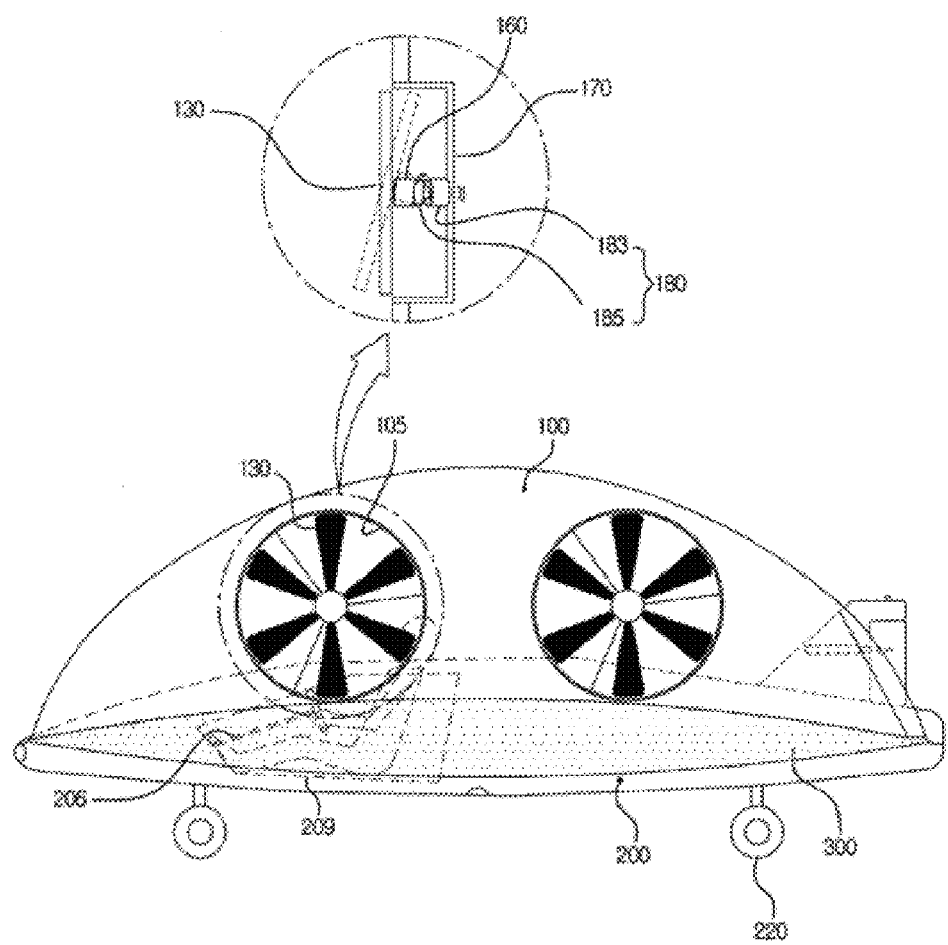
FIG. 5 is a side view illustrating the flying object system in accordance with the embodiment of the present invention in a state in which wings are folded.

Now, preferred embodiments of the present invention will be described in detail with reference to the annexed drawings.

As shown in FIGS. 2 to 8, in a flying object system of the present invention, more than three wheels 220 for ground traveling are provided on the lower surface of a main body 200, and a control block 228 is integrally provided on each of the wheels 220 such that the rotating directions of the wheels 220 are controlled and the heights of the wheels 220 are adjusted by fluid pressure or air pressure.

Here, a motor (not shown) is further connected to each of the wheels 220 such that the wheels 220 are rotated.

Further, the main body 200 may be made of a material, such as duralumin, like a general flying object, or the remaining parts of the main body 200 except for a control room 209 forming frames of the main body 200 may be made of a tube body including a plurality of compartments, which are divided from each other by partitions, as described below.

The compartments are installed such that air is simultaneously or selectively supplied to and discharged from the compartments through a pump 205.

The tube body is obtained by coating a net made of a heat-resistant fiber, serving as frames, with silicon.

Further, a gyrosensor 207 to sense a level state is provided on the main body 200, and a control lever 206 connected to the gyrosensor 207 is installed within the control room 209.

A vertical control unit 204 and a horizontal control unit 202 are further provided at the rear portion of the main body 200 to provide directionality to the flying object.

Further, wings 100 are respectively connected to both sides of the main body 200 through variable units 300.

Each of the variable units 300 includes a plurality of variable chambers provided on a connection part between each of the wings 100 and the main body 200.

Each of the variable units 300 further includes a volume conversion part 303 to adjust an expansion degree at one side of the variable chambers.

When the wings 100 are respectively connected to both sides of the main body 200 through the variable units 300, more than two propellers 130 are installed on each of the wings 100.

Each of the propellers 130 is connected to a support unit 170, which is connected to a mounting part 105, vertically formed through each of the wings 100, through a rotary shaft 190, by a position conversion unit 180, and is connected directly to a power generation unit 160.

The position conversion unit 180 has a connection structure of a first plate 183, which is rotated, and a second plate 185, which is tilted in one direction.

The power generation unit 160 is selected from a motor driven by a general fuel cell, or an internal combustion engine.

Each of the wings 100 includes a plurality of compartments 103 connected by partitions 101.

Each of the wings 100 further includes an adjust chamber 107 at the central portion thereof.

Here, the compartments 103 and the adjust chamber 107 are installed such that air is simultaneously or selectively supplied to and discharged from the compartments 103 and the adjust chamber 107 through the pump 205 and a pipe connected thereto.

Further, the wings 100 may have a double structure including an external wing unit and an internal wing unit.

An anemometer 265 and an anemoscope 267 are further provided on the main body 200, and ailerons 800 to control the rolling of the flying object system are respectively provided at the rear portions of the wings 100.

Bulletproof members 950, which are manually or automatically slid, are provided on the bottom of the control room 209 of the main body 200, and a balloon 900 to increase lift force and protect the control room 209 in the event of crash is further provided at one side of the upper surface of the main body 200.

Here, the balloon 900 is generally located within the main body 200, and serves as a parachute through a plurality of wires connected thereto to allow the balloon 900 to be located at the center of gravity of the main body 200 in case of emergency. The wires may be used as cables for traction.

A zipper member 970 is provided at the edge of each of the wings 100 such that the wings 100 are foldable when the wings 100 are not in use. Further, a handle 975 is further provided at one side of each of the wings 100 to facilitate the movement of the flying object system.

Further, an auxiliary propeller 980 is provided at the front portion of the main body 200.

Hereinafter, the operation of the above flying object system of the present invention will be described.

As shown in FIGS. 2 to 8, the flying object system can travel on the ground through more than the three wheels 220 for ground traveling, connected to the lower surface of the main body 200, and the wheels 220 are interlocked with the control lever 206 so that the rotating directions of the wheels 220 can be changed when the control lever 206 is manipulated.

Further, the heights of the wheels 220 are adjusted when the pressure of a fluid is transmitted to the wheels 220 through the control blocks 228, and thus the level state of the flying object system is maintained even when the flying object system lands on the uneven surface of the ground.//

Power to cause the wheels 220 to travel employs driving force of the motors driven by power supplied from the main body 200 when the flying object system travels at a low speed or is parked, or propulsive force of the propellers 130 installed on the wings 100 when the flying object system travels at a high speed.

Further, the main body 200 provided with a reception space and the control room 209 installed therein may be made of a lightweight material maintaining a uniform strength, such as duralumin or titanium, or the exterior part of the main body 200 except for the control lever 206 and some frames may be made of a tube body, into which air or gas can be injected.

In case that the exterior part of the main body 200 is made of the tube body, when the inside of the main body 200 is filled with air or gas, such as helium, lift force is increased and power consumption is minimized. Further, in this case, impact applied to the main body 200 when the flying object system crashes is absorbed, and thus users are more safely protected.

Further, the wings 100 providing lift force to the flying object system are installed at both sides of the main body 200 to maintain the balance of the main body 200. The wings 100 are also made of a tube body and are provided with the plural compartments 103 divided by the partitions 101, thus exhibiting the same effect as that of the above-described main body 200 made of the tube body.

The variable units 300 are respectively provided on the upper and lower portions of the wings 100, when the wings 100 are connected to the main body 200 through hinge shafts (not shown). Therefore, upward and downward gradients of the wings 100 from a line being horizontal with the connection parts between the main body 200 and the wings 100 are adjusted by injecting air into the variable units 300 via the pumps 205.//

The variable units 300 include the plurality of the variable chambers, which are expanded by injecting air into the chambers. Therefore, in case that a large amount of air is injected into the upper portions of the lower portions of the variable units 300, the wings 100 are folded in the perpendicular direction to the main body 200 through the expansions of the volume conversion parts 303, each of which is an elastic tube or a bellows member made of plastic including an external guide plate to be expanded and contracted only up to a designated part. Thereby, the flying object system may travel and be kept in a minimum space.

Further, gas is supplied to the wings 100 due to exhaust pressure of the pumps 205 or an engine used as a power source. The gas is selectively supplied to the wings 100 through branch units 201, and lines from the branch units 201 are connected to the respective compartments 103 such that the gas can be simultaneously supplied to the plural compartments 103 of the wings 100.

More than the two propellers 130 are installed on each of the wings 100, and the propellers 130 improve directionality against the center of gravity of the main body 200 of the flying object system.

Since the propellers 130 are rotated and tilted through the position conversion units 180, the angles of the propellers 130 in all directions are adjusted, and thus the direction of the flying object system may be adjusted without the vertical control unit 204 and the horizontal control unit 202. Further, hovering, three-dimensional direction change and forward and backward movement of the flying object system may be achieved.

Figure 6:
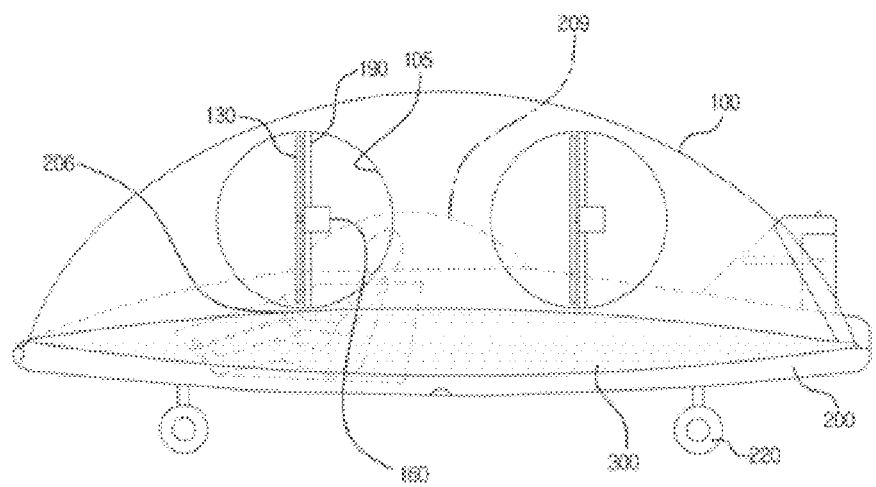
FIGS. 6 and 7 are side and rear views illustrating a flying object system in accordance with another embodiment of the present invention.
Figure 7:
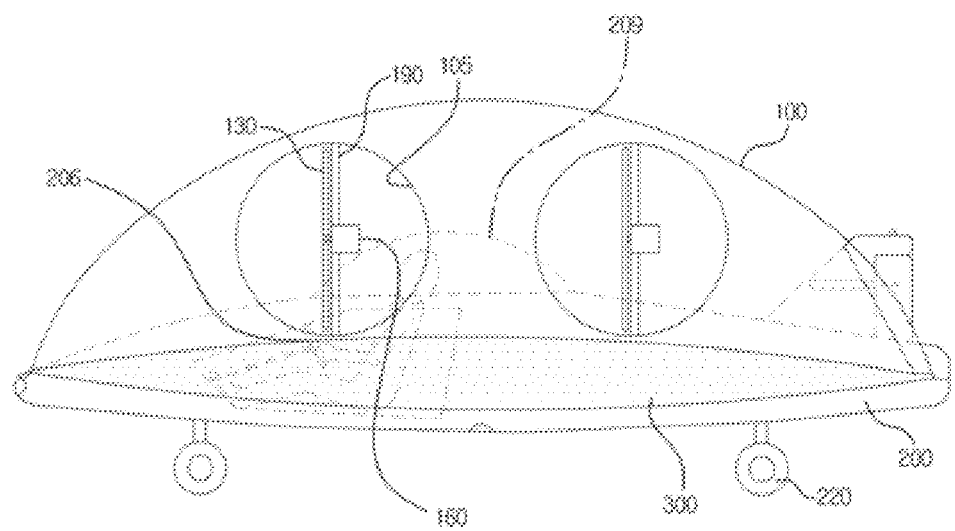
Figure 8:
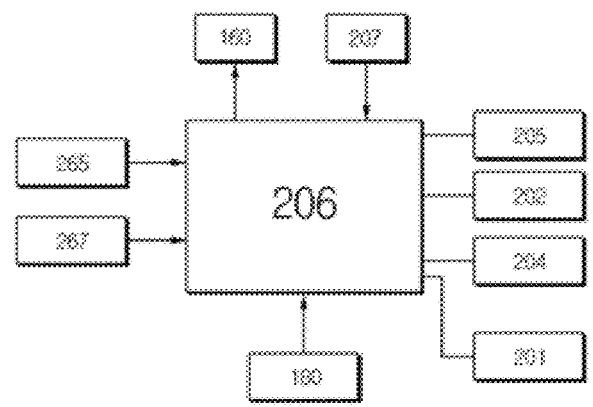
FIG. 8 is a block diagram illustrating a control state of the flying object system in accordance with the present invention.

Further, the power generation unit 160 may be connected to the propeller 130 such that the propeller 130 is rotated through the rotary shaft 190, as shown in FIGS. 6 and 7, thus generating propulsive force in a direction forming a designated angle with the wing 10.

The auxiliary propeller 980 is further provided at the front portion of the main body 200.

When the auxiliary propeller 980 provided at the front portion of the main body 200 is operated, the flying and traveling speeds of the flying object system are increased.

Further, the auxiliary propeller 980 varies a tilting degree and a rotating speed according to wind velocity in hovering and vertical takeoff and landing, and thus allows the hovering and vertical takeoff and landing of the flying object system due to the operations of the propellers 130 to be safely carried out.

The propulsive force generated by the propellers 130 induces lift force due to the shape of the wings 100, and the control of the flying object system is achieved through the vertical control unit 204, the horizontal control unit 202, and the ailerons 800.

Each of the wings 100 includes the adjust chamber 107 provided in the perpendicular direction of the compartments 103, and thus the width of the wings 100 is increased or decreased by inserting gas into the adjust chamber 10 and the wings 100 have various shapes according to flying conditions.

Further, the anemometer 265 and the anemoscope 267, which are provided on the main body 200, judge external drag when the flying object flies, and thereby adjust the angles and the numbers of rotations of the respective propellers 130, thus generating propulsive force and lift force. The gyrosensor 207 senses the current state of the flying object, and thus properly adjust propulsive force and lift force.

The above-described flying object system of the present invention judges drag due to external surrounding factors in a direction to be flied using the anemometer 265 and the anemoscope 267, judges the current state of the flying object using the gyrosensor 207, and then determines the directionality of the flying object while generating propulsive force and lift force by manipulating the pumps 205, the power generation units 160, and the position conversion units 180 connected to the control lever 206.

Here, the propellers 130, the angles of which are adjusted by the position conversion units 180, may provide only propulsive force, and the flying object system may be controlled through the vertical control unit 204, the horizontal control unit 202, and the ailerons 800 connected to the control lever 206.

Further, a plurality of cameras (not shown) is mounted on the main body 200, and transmits the state of the flying object system to the outside by wire or wirelessly such that the flying object system can be controlled from the outside wirelessly through a wireless installation, such as a portable phone.

The above-described flying object system of the present invention includes the foldable wings and occupies a small space, thus effectively using a parking space. Moreover, the flying object system easily passes through a narrow road.

The flying object system of the present invention may be parked on the top or the veranda of a house. Further, the flying object system unfolds the wings 100 and takes off, when traffic congestion occurs during traveling on the ground, thereby relieving the traffic congestion and contributing to the national economy due to a smooth flow of public transportation.

As apparent from the above description, the present invention provides a flying object system performing ground traveling, which has a light weight to minimize fuel consumption, travels on a road on the ground and takes off and flies in the air in traffic congestion, and flies in the air and lands and travels on a road on the ground if necessary to rapidly move to a destination without the effects of traffic congestion, has a tube shape as a whole to alleviate impact in the event of a crash and thus be used stably, and properly varies the shape of wings and lift force generated from respective propellers according to usage conditions to improve flying performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flying object system performing ground traveling, which travels with three or more wheels connected to a lower surface of a main body, generates flying force through wings symmetrically installed at both sides of the main body, and is provided with a plurality of propellers, operated by a control lever and installed on the wings which are attached to a part of the main body, to generate lift force and propulsive force of the main body, each of the wings being divided into a plurality of compartments to be folded or be changed in shape by pressure of gas, wherein each of the wings is divided into the plurality of compartments, and gas is supplied by a pump installed in the main body, wherein the plurality of compartments is divided from each other by partitions so that the gas is simultaneously or selectively supplied to the plurality of compartments by the pump, and wherein an adjust chamber is provided in the perpendicular direction of the compartments so that the width of the wings is increased or decreased by inserting gas into the adjust chamber.

2. The flying object system according to claim 1, wherein the propellers adjust tilt angles thereof on the wings through position conversion units after vertical ascent of the flying object system, and thus achieve hovering, three-dimensional direction change and forward and backward movement of the flying object system.

3. The flying object system according to claim 1, wherein when the propellers set tilt degrees thereof through position conversion units after vertical ascent of the flying object system, and thus adjust the direction of the flying object system in connection with a vertical control unit, a horizontal control unit, and ailerons installed at the rear portion of the main body, when the propellers generate propulsive force and lift force.

4. The flying object system according to claim 2, wherein each of the position conversion units includes a first plate provided on a support unit, connected a mounting part of each of the wings through a rotary shaft, and rotated, and a second plate tilted around the first plate, and is rotated and tilted in all directions.

5. The flying object system according to claim 1, wherein the control lever is provided with a gyrosensor to sense a level state of the flying object system, and an anemometer and an anemoscope to control a stable posture of the flying object system in direction change according to the velocity and direction of the wind, hovering, and takeoff and landing.

6. The flying object system according to claim 1, wherein the control lever is provided with a vertical control unit, a horizontal control unit, and ailerons to adjust a posture of the flying object system.

7. The flying object system according to claim 1, wherein a power generation unit of each of the propellers is a motor driven by a fuel cell or an internal combustion engine.

8. The flying object system according to claim 1, wherein an auxiliary propeller is provided at the front portion of the main body.

9. The flying object system according to claim 1, wherein a balloon is provided at one side of the upper surface of the main body.

10. The flying object system according to claim 1, wherein each of the wings has a double structure including an external wing unit and an internal wing unit.

11. The flying object system according to claim 1, wherein the ascent and descent of the wheels is adjusted by pressure of a fluid.

12. The flying object system according to claim 1, wherein sliding bulletproof members are provided on a bottom of the main body.

13. The flying object system according to claim 1, wherein a plurality of cameras is mounted on the main body such that the flying object system is wirelessly controlled from the outside.

14. The flying object system according to claim 3, wherein each of the position conversion units includes a first plate provided on a support unit, connected a mounting part of each of the wings through a rotary shaft, and rotated, and a second plate tilted around the first plate, and is rotated and tilted in all directions.

* * * * *